US012807035B2

(12) United States Patent
Gannamaneni et al.

(10) Patent No.: US 12,807,035 B2
(45) Date of Patent: Nov. 24, 2026

(54) BATTERY SYSTEM FOR A VEHICLE, VEHICLE COMPRISING A BATTERY SYSTEM AND METHOD FOR EVALUATING AN IMPEDANCE OF A BATTERY SYSTEM FOR A VEHICLE

(71) Applicant: Volvo Car Corporation, Gothenburg (SE)

(72) Inventors: Narendar Rao Gannamaneni, Gothenburg (SE); Johan Sjöstedt, Gothenburg (SE); Srdan Bjelic, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/410,158

(22) Filed: Jan. 11, 2024

(65) Prior Publication Data

US 2024/0239239 A1 Jul. 18, 2024

(30) Foreign Application Priority Data

Jan. 17, 2023 (EP) .................................... 23151996

(51) Int. Cl.
*B60L 58/20* (2019.01)
*B60L 58/22* (2019.01)
(Continued)

(52) U.S. Cl.
CPC ............... *B60L 58/20* (2019.02); *B60L 58/22* (2019.02); *H02J 7/52* (2026.01); *H02J 7/80* (2026.01);
(Continued)

(58) Field of Classification Search
None
See application file for complete search history.

(56) References Cited

U.S. PATENT DOCUMENTS 11,435,405 B2 9/2022 Gong et al.
2014/0077870 A1* 3/2014 Liu .......................... G05F 1/62 327/540
(Continued)

FOREIGN PATENT DOCUMENTS

CN 112 630 674 A 4/2021
DE 102020108895 A1 9/2021

OTHER PUBLICATIONS

Jul. 4, 2023 European Search Report issued in corresponding EP application No. 23151996.
(Continued)

*Primary Examiner* — Menatoallah Youssef
*Assistant Examiner* — Aqeel H Bukhari
(74) *Attorney, Agent, or Firm* — Clements Bernard Walker; Christopher L. Bernard

(57) ABSTRACT

A battery system for a vehicle, a vehicle including a battery system, a method for evaluating an impedance of a battery system and a computer program element. The battery system includes a first battery pack and an evaluation unit for evaluating an impedance of the first battery pack. The evaluation unit includes a current injection circuit, which has a first DC/DC converter and is arranged in the battery system and/or adjacent to the first battery pack, and a measuring circuit. The first DC/DC converter is configured to generate a first current signal at a plurality of frequencies, and the measuring circuit is configured to record and/or analyze the first current signal from the first DC/DC converter for evaluating the impedance of the first battery pack by means of a ratio of a voltage difference of the first battery pack to the current of the first current signal.

17 Claims, 5 Drawing Sheets

(51) Int. Cl.
*H02J 7/52* (2026.01)
*H02J 7/80* (2026.01)

(52) U.S. Cl.
CPC ... *B60L 2240/547* (2013.01); *B60L 2240/549* (2013.01)

(56) References Cited

U.S. PATENT DOCUMENTS

| | | | |
|---|---|---|---|
| 2017/0297440 | A1* | 10/2017 | Hu .......................... H02M 3/04 |
| 2018/0364311 | A1* | 12/2018 | De Breucker ....... G01R 31/396 |
| 2019/0296403 | A1 | 9/2019 | Ballantine et al. |
| 2020/0225291 | A1 | 7/2020 | Hinterberger et al. |
| 2021/0333328 | A1* | 10/2021 | Chung ................ H01M 10/482 |
| 2021/0356525 | A1* | 11/2021 | Van Vroonhoven ......................... H01M 10/482 |
| 2022/0268846 | A1 | 8/2022 | Lopez De Arroyabe et al. |

OTHER PUBLICATIONS

Moore et al "Online condition monitoring of lithium-ion batteries using impedance spectroscopy" IEEE, Oct. 1, 2017, pp. 5617-5624.

Wang et al "A Novel System for Measuring Alternating Current Impedance Spectra of Series-Connected Lithium-Ion Batteries With a High-Power Dual Active Bridge Converter and Distributed Sampling Units", IEEE, USA, vol. 68, No. 8, Jun. 17, 2020, pp. 7380-7390.

Cheng et al "Extraction of Intrinsic Parameters of Lead-Acid Batteries Using Energy Recycling Technique", IEEE, USA, vol. 34, No. 5, May 1, 201, pp. 4765-4779.

Varnosfaderani et al., Online impedance spectroscopy estimation of a dc-dc converter connected battery using a switched capacitor-based balancing circuit. The Journal of Engineering, 2019: 4681-4685.

* cited by examiner

BATTERY SYSTEM FOR A VEHICLE, VEHICLE COMPRISING A BATTERY SYSTEM AND METHOD FOR EVALUATING AN IMPEDANCE OF A BATTERY SYSTEM FOR A VEHICLE

CROSS-REFERENCE TO RELATED APPLICATION

The present disclosure claims the benefit of priority of co-pending European Patent Application No. 23 151 996.8, filed on Jan. 17, 2023, and entitled “BATTERY SYSTEM FOR A VEHICLE, VEHICLE COMPRISING A BATTERY SYSTEM AND METHOD FOR EVALUATING AN IMPEDANCE OF A BATTERY SYSTEM FOR A VEHICLE,” the contents of which are incorporated in full by reference.

TECHNICAL FIELD

The present disclosure relates to a battery system for a vehicle, a vehicle including a battery system, a method for evaluating an impedance of a battery system for a vehicle and a computer program element for a battery system.

BACKGROUND

In modern electric vehicle industry, electric vehicle batteries are used as rechargeable batteries to power the electric motors of battery electric vehicles (BEVs) or hybrid electric vehicles (HEVs). Lithium-ion batteries are typically provided and developed to improve characteristics, for example the power-to-weight ratio, of the electric vehicles. Accordingly, a reliable evaluation system is required to estimate the performance of the electric vehicle batteries.

In general, electrochemical impedance spectroscopy (EIS) of rechargeable battery cells is used in electric vehicle applications and the further related industrial applications. The benefits of the electrochemical impedance spectroscopy may exist, for example, in accurate measurement of a state of health of the battery cells or in determining an aging, a lithium plating formation process and an electrolyte conductivity of the battery cells. Electrochemical processes associated with the electrolyte interactions may be simulated or computed as an electrical equivalent circuit involving electrical components such as resistors, capacitors and inductors, thereby plant or controller transfer functions may be identified.

BRIEF SUMMARY

It is an objective of the present disclosure to provide an improved performance evaluating system for one or more battery cells of a battery electric vehicle.

According to a first aspect, there is provided a battery system for a vehicle, which includes a first battery pack and an evaluation unit that is configured to evaluate an impedance of the first battery pack and includes a current injection circuit having a first DC/DC converter and a measuring circuit. The current injection circuit is arranged in the battery system and/or adjacent to the first battery pack of the battery system.

The first DC/DC converter of the current injection circuit is configured to generate a first current signal at a plurality of frequencies. The measuring circuit is configured to record and/or analyze the first current signal from the first DC/DC converter for evaluating the impedance of the first battery pack by means of a ratio of a voltage difference of the first battery pack to the current of the first current signal.

In order to perform electrochemical impedance spectroscopy for the battery system of the electric vehicle, an injection circuit hardware, which may be the current injection circuit, and a measurement circuit, which may be the measuring circuit, are to be provided in the evaluation unit of the battery system. In other words, the injection hardware needs to be added to the preexisting battery system, so that the injection hardware or the current injection circuit may be physically placed close to the first battery pack, so that the battery system with the evaluation unit may include a compact construction.

Moreover, as an additional circuit to the preexisting electric vehicle battery architecture, the current injection circuit of the evaluation unit may be considered to require extra cost or space inside the battery system or surrounding the first battery pack. In order to address this, the battery system may reuse the first DC/DC converter, which may be an existing power converter of the power-supplying battery system of the vehicle and provided within the high voltage propulsion architecture of the electric vehicles. Therefore, the first DC/DC converter may be designed to be bi-directional, so that the electrical component such as the first DC/DC converter may be used for multiple purposes, namely supplying power from the battery pack to one or more loads of the vehicle and generating an injection current or the first injection current signal for the impedance analysis of the battery pack.

The vehicle may be a high power electric vehicle and the first battery pack may be a first high voltage battery pack consisting of one or more battery cells.

The evaluation unit may be configured to evaluate the impedance of the first battery pack by following an operating principle which is comparable to that of the small-signal excitation analysis typically used in control systems. For example, the electrical impedance of the battery cells may be measured at different frequencies by injecting a sinusoidal current into the battery cells. The ratio between the measured battery cell voltage to the injected sinusoidal current may provide the impedance information which may consists of a real part term as a resistance term and an imaginary part term as a reactance term. The imaginary reactance term may further contains a capacitive reactance and an inductive reactance.

In an example, the battery system may further include a second battery pack. The second battery pack may be connected to the first battery pack in series.

The combined and connected first and second battery packs may supply a higher power as whole to one or more high voltage loads of the electric vehicle. It may also be important to provide a battery system with an evaluation unit that may allow the independent estimation or evaluation of the first battery pack and the second battery pack.

In an example, the first DC/DC converter may be a first high voltage to low voltage DC/DC converter and/or a bi-directional high voltage to low voltage DC/DC converter. The first high voltage to low voltage DC/DC converter may be electrically connected to the first battery pack.

Alternatively or additionally, the first high voltage to low voltage DC/DC converter may be configured to operate in a reverse power transfer mode for charging the first battery pack.

The bi-directional high voltage to low voltage DC/DC converter may be electrically connected to the first high voltage battery pack on one side and, on the other side, to a low voltage battery, which may further be electrically connected to the chassis of the vehicle, and one or more low voltage loads that may further be electrically connected to the chassis of the vehicle. The first high voltage to low voltage DC/DC converter may be designed to operate in a reverse power transfer mode, so that the first high voltage battery pack may be charged from the low voltage battery. Further, the first high voltage to low voltage DC/DC converter may be permanently electrically connected to the low voltage battery.

In an example, the current injection circuit of the evaluation unit may further include a second DC/DC converter, which may be a second high voltage to low voltage DC/DC converter and/or a bi-directional high voltage to low voltage DC/DC converter. The second DC/DC converter may be electrically connected to the second battery pack and/or configured to operate in the reverse power transfer mode for charging the second battery pack.

The second battery pack may also be a second high voltage battery pack. The second bi-directional high voltage to low voltage DC/DC converter may further be connected to a second low voltage battery for generating a second injection current to the second high voltage battery pack from the second low voltage battery for evaluating the impedance of the second high voltage battery pack, while the first bi-directional high voltage to low voltage DC/DC converter being connected to the first low voltage battery for generating the first injection current to the first high voltage battery pack from the first low voltage battery for evaluating the impedance of the first high voltage battery pack. Hence, the impedance evaluation of the first high voltage battery pack and the second high voltage battery pack may be performed independently.

However, as the low voltage power consumption on the first low voltage battery may not be equal to the low voltage consumption on the second low voltage battery, this may result in an energy unbalance between the first and the second battery packs. In order to achieve the energy balance between the first battery pack and the second battery pack, a different first DC/DC converter may be needed.

In an example, the first DC/DC converter may be a buck-boost DC/DC converter and/or a high voltage to high voltage buck-boost DC/DC converter.

Moreover, the first DC/DC converter may be electrically connected to the first battery pack and/or the second battery pack and configured to balance an energy difference between the first battery pack and the second battery pack.

In an example, the first DC/DC converter may include a first transistor, which may be electrically connected to the first battery pack, a second transistor, which may be electrically connected to the second battery pack, and an energy storing unit. The first transistor, the second transistor and the energy storing unit may be electrically interconnected.

The first DC/DC converter or the high voltage to high voltage non-isolated buck-boost DC/DC converter may be configured to transfer the energy or the voltage consumption from the first high voltage battery pack to the second high voltage battery pack or in the reversed direction, resulting in the energy balance by connecting the high voltage to high voltage non-isolated buck-boost DC/DC converter as a whole component to the first and second battery packs.

The first transistor and the second transistor may be a metal-oxide-semiconductor field-effect transistor (MOSFET), respectively.

In an example, the energy storing unit may be a circuit including an inductor and/or a capacitor.

Moreover, the high voltage to high voltage non-isolated buck-boost DC/DC converter may further include a further capacitor, which may be electrically connected to the DC lines of the connected first and second battery packs.

In an example, the first DC/DC converter may be configured to generate the first current signal for the first battery pack by turning on the second transistor and turning off the first transistor for a first predefined time interval for storing energy in the energy storing unit. The stored energy may then be able to charge the first battery pack by turning on the first transistor and turning off the second transistor.

Alternatively or additionally, the first DC/DC converter may be configured to generate a second current signal for the second battery pack, and/or to charge the second battery pack, by turning on the first transistor and turning off the second transistor for a second predefined time interval, so that the second transistor may be able to be turned on to charge the first battery pack.

In an example, the first DC/DC converter of the current injection circuit may be configured to alternatively switch the first transistor and/or the second transistor at the plurality of frequencies for generating the first current signal and/or the second current signal by regulating a first duty cycle of the first transistor and/or a second duty cycle of the second transistor.

The first predefined time interval may be equal to the second predefined time interval. Alternatively, the first predefined time interval may differ from the second predefined time interval.

In an example, the first current signal and/or the second current signal of the current injection circuit may be a pulse current signal at the plurality of frequencies ranging from 1 mHz to 4 kHz.

In an example, the battery system may further include at least one contactor that may be connected to the first battery pack and configured to block a connection of the first battery pack to a first load.

For example, the at least one contactor may include a first contactor and a second contactor that may be connected, respectively, to the positive and negative DC lines of the first high voltage battery pack or the combined first and second high voltage battery packs as a whole. For example, the first and second contactors may be configured to block a connection of the first high voltage battery pack to the first high voltage load. Additionally, the first and second contactors may be designed to be opened during the impedance measurement to avoid the influence of input capacitances of the first high voltage load.

It is to be noted that the second contactor may be closed during the operation. The first duty cycle of the first transistor and the second duty cycle of the second transistor may be regulated, respectively, depending on the current injection setpoint of the first current signal for charging the first battery pack and the current injection setpoint of the second current signal for charging the second battery pack.

The impedance of the first battery pack and the second battery pack may be measured by the measuring circuit of the evaluation unit simultaneously with the respective current flows injected current of the first current signal and the sourced current of the second current signal. Depending on the current sensor direction, the pulse current of the first current signal and the pulse current of the second current signal may be measured either with a zero degree phase shift or with a 180 degree phase shift. In case of the current injection in the first battery pack, the ratio between the measured voltage of the first battery pack and the measured injected current of the first current signal for the first battery pack and/or the ratio between the measured voltage of the second battery pack to the sourced injected current of the second current signal for the second battery pack may give the impedance information of the respective battery packs. This may also be applicable when the current flow direction is reversed and the injection current flows into the second battery pack with the sourced current from the first battery pack.

At different frequencies, the generated first and second current signal may include various waveshape. For example, at a low frequency of 100 Hz, the first current signal and the second current signal may follow a square waveshape by alternatively switching the first transistor and the second transistor and by regulating the first duty cycle of the first transistor and the second duty cycle of the second transistor, meaning that, for example, the majority of the current drawn from the second battery pack may flow into the first battery pack and the influence of the capacitor of the energy storing unit and a further capacitor of the first buck-boost DC/DC converter on the injected current for the first battery at this frequency may be very less or neglectable. When the injection frequency increases and/or the capacitances of the capacitors of the first buck-boost DC/DC converter increase, the injected current of the first current signal and the injected current of the second current signal may start to distort, without at least not completely following the square waveshape, and the influence of the capacitors may become visible on the rising and falling edges of the current signals.

According to a second aspect, there is provided a vehicle that includes a battery system according to the present disclosure.

In the electric vehicle having the battery system, electrochemical impedance spectroscopy may be performed continuously or in a predefined interval, so that the state of health may be measured accurately and further characteristics of the battery, for example, the aging, the lithium plating formation and the electrolyte conductivity, may be determined for evaluating the performance of the system of the battery cells and the safety and reliability of the electric vehicle.

According to a third aspect, there is provided a method for evaluating an impedance of a battery system for a vehicle. The method includes the following steps: first, arranging a current injection circuit of an evaluation unit in the battery system and/or adjacent to a first battery pack of the battery system; subsequently, generating a first current signal at a plurality of frequencies by means of a first DC/DC converter of the current injection circuit; finally, recording and analyzing the first current signal from the first DC/DC converter by means of a measuring circuit of the evaluation unit and evaluating the impedance of the first battery pack by means of a ratio of a voltage difference of the first battery pack to the current of the first current signal.

In an example, the method may further include the step of generating the first current signal for the first battery pack by means of the first DC/DC converter as a high voltage to low voltage DC/DC converter at the plurality of frequencies by using a reverse power transfer mode of the first DC/DC converter.

Alternatively, the method may further include the step of generating the first current signal for the first battery pack by means of the first DC/DC converter as a buck-boost DC/DC converter by turning on a second transistor of the first DC/DC converter, while turning off a first transistor of the first DC/DC converter for a first predefined time interval for storing energy in an energy storing unit of the first DC/DC converter. In this way, the stored energy may be able to charge the first battery pack by turning on the first transistor and turning off the second transistor.

Alternatively or additionally, the method may further include the step of generating a second current signal for a second battery pack by means of the first DC/DC converter by turning on the first transistor while turning off the second transistor for a second predefined time interval, so that the second transistor may be able to be turned on to charge the first battery pack.

Moreover, the method may further include the step of alternatively switching the first transistor and/or the second transistor of the first DC/DC converter at the plurality of frequencies by regulating a first duty cycle of the first transistor and/or a second duty cycle of the second transistor.

According to a fourth aspect, there is provided a computer program element for a battery system according to the present disclosure, which, when being executed by a processing element of a vehicle, is adapted to perform the method steps of the third aspect.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

It should be noted that the above examples may be combined with each other irrespective of the aspect involved. Accordingly, the method may be combined with structural features and, likewise, the apparatus and the system may be combined with features described above with regard to the method.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
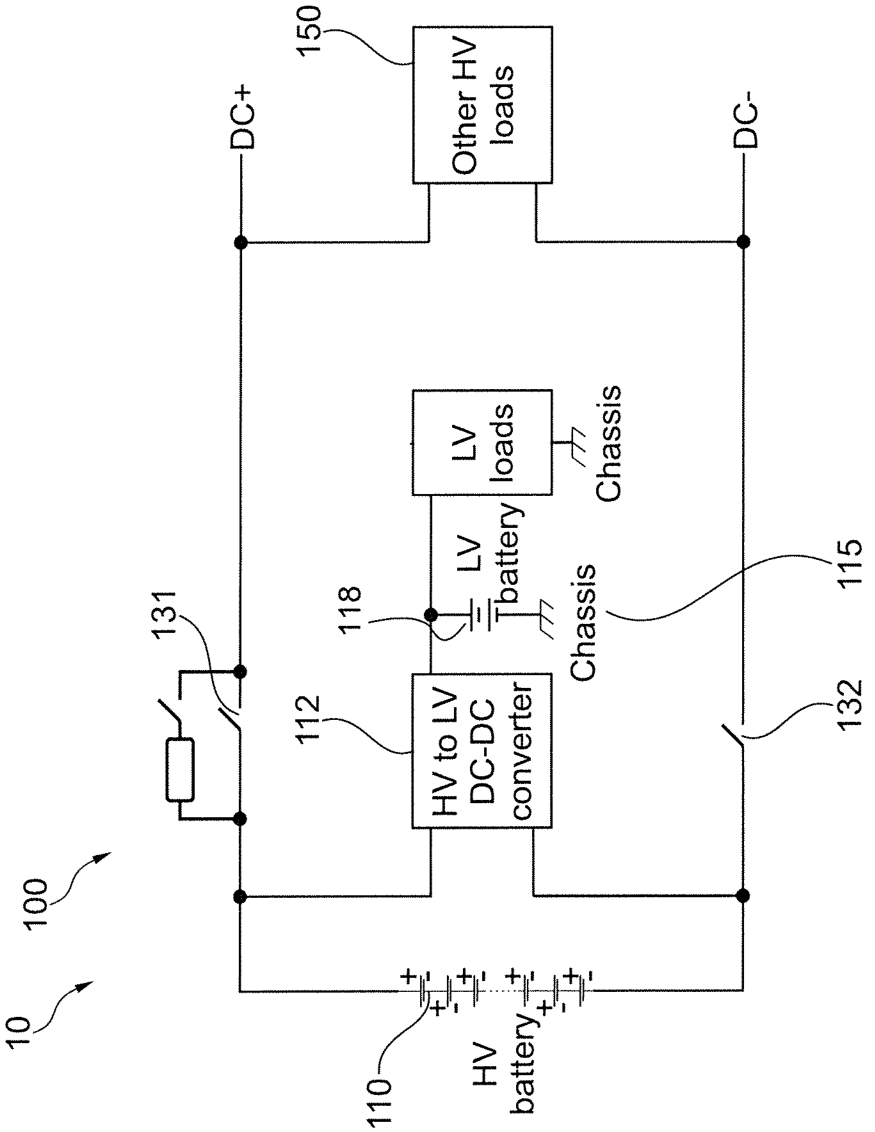
FIG. 1 shows schematically an example of a battery system according to the present disclosure.
Figure 5:
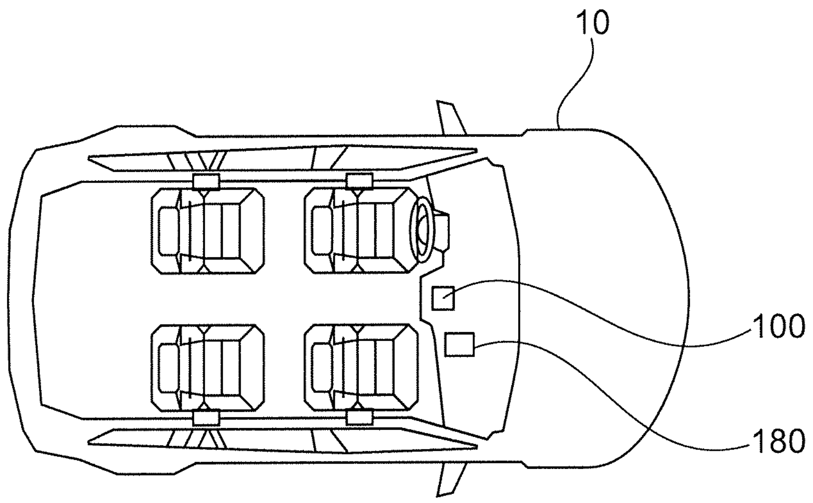
FIG. 5 shows schematically an example of a vehicle according to the present disclosure.

FIG. 1 shows a battery system 100, which may be arranged in a vehicle 10 that is an electric vehicle in the present example (also shown in FIG. 5).

The battery system 100 includes a first battery pack 110 that may include one or more battery cells connected in series and may be designed to supply the electric vehicle with a high voltage power. Hence, the first battery pack 110 is a high voltage battery pack in the electric vehicle high voltage architecture as shown in FIG. 1. The first battery pack 110 may be connected to a first load 150 that may be a first high voltage load of the vehicle 10.

In order to evaluate the performance and the stability of the battery system, in particular, in order to estimate an impedance of the first battery pack 110, the battery system 100 includes an evaluation unit that has a current injection circuit as an injection circuit hardware for injecting the current, for example by following the operating principle similar to that of a small-signal excitation analysis, at one or more frequencies, and a measuring circuit as a measurement circuit. The current injection circuit may be arranged in the battery system 100. Alternatively or additionally, the current injection circuit may be arranged adjacent to the first battery pack 110.

The current injection circuit includes a first DC/DC converter 112 that is designed to generate a first current signal 111 at a plurality of frequencies. The first DC/DC converter 112 may be a first high voltage to low voltage DC/DC converter, in particular a bi-directional high voltage to low voltage DC/DC converter in the electric vehicle high voltage architecture. The high voltage to low voltage DC/DC converter 112 may be electrically connected to the first high voltage battery pack on one side and, on the other side, to a low voltage battery 118, which may further be electrically connected to the chassis of the vehicle 10, and one or more low voltage loads that may further be electrically connected to the chassis of the vehicle. The first high voltage to low voltage DC/DC converter 112 may be designed to operate in a reverse power transfer mode, so that the first high voltage battery pack 110 may be charged from the low voltage battery 118. Further, the first high voltage to low voltage DC/DC converter 112 may be permanently electrically connected to the low voltage battery 118.

The pulse current of the first current signal 111 from the first high voltage to low voltage DC/DC converter 112 of the current injection circuit may be generated at various frequencies, for example ranging from 1 mHz to 4 kHz on the high voltage side using the reverse power transfer capability of the first DC/DC converter 112.

The measuring circuit of the evaluation unit may be configured to record and/or analyze the first current signal 111 at the plurality of frequencies, so that the impedance of the first high voltage battery pack 110 may be evaluated at the respective injected frequency by determining a ratio of a voltage difference of the first battery pack 110, between an open circuit voltage of the battery pack 110 and a measured terminal voltage of the battery pack 110, to the injected pulse current of the first current signal.

The battery system 100 further includes at least one contactor. As shown in FIG. 1, a first contactor 131 and a second contactor 132 are connected, respectively, to the positive and negative DC lines of the high voltage battery pack 110. The first and second contactors 131, 132 may be configured to block a connection of the first high voltage battery pack 110 to the first high voltage load 150, which may for example be a traction inverter or an onboard charger. As such, the first and second contactors 131, 132 may be designed to be opened during the impedance measurement to avoid the influence of input capacitances of the first high voltage load 150.

Figure 2:
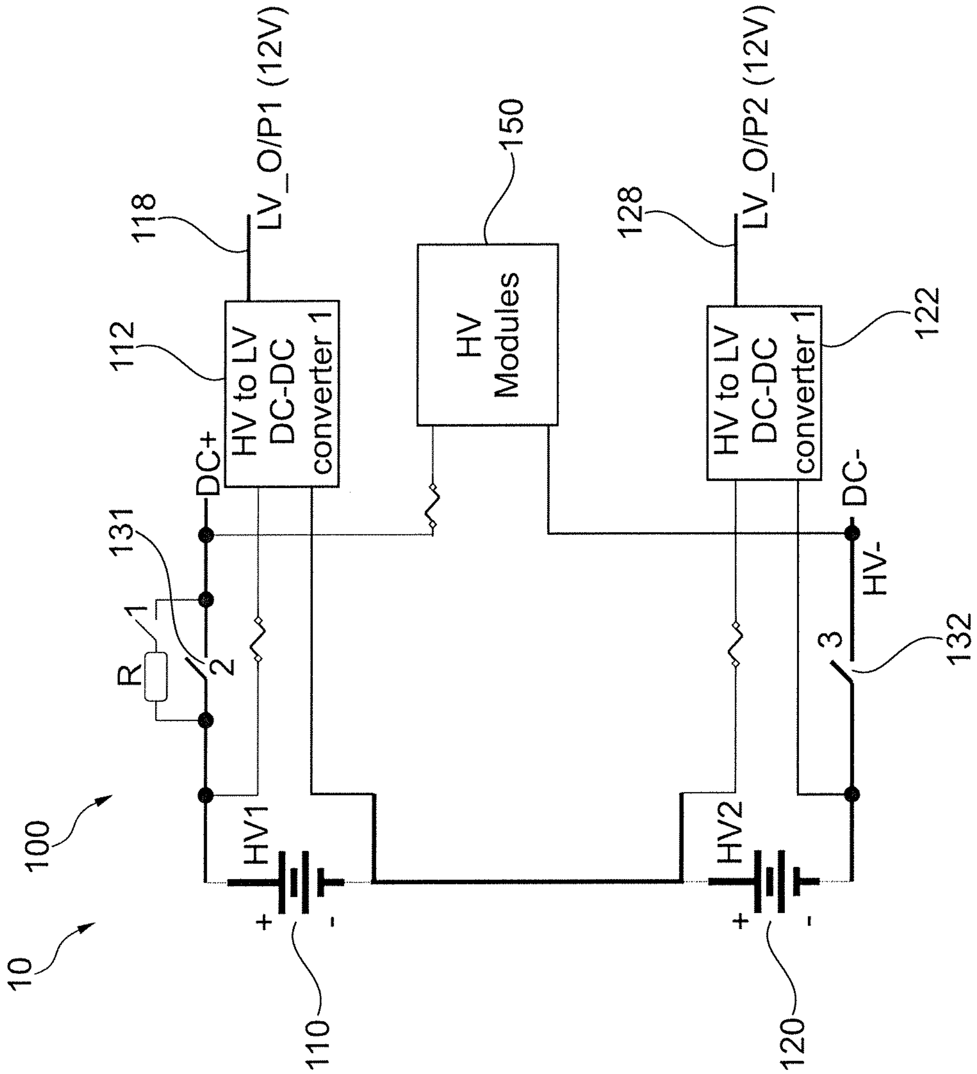
FIG. 2 shows schematically an example of a battery system according to the present disclosure.

FIG. 2 shows a further example of a battery system 100, which follows the same operating principle comparable to that of the small-signal excitation analysis for a split battery electric vehicle high voltage architecture. Compared to the battery system in FIG. 1, the battery system 100 in FIG. 2 further includes a second battery pack 120 that may be a second high voltage battery pack having one or more high voltage battery cells. The second battery pack 120 is connected to the first high voltage battery pack 110 in series and designed to operate in the reverse power transfer mode for charging the second battery pack 120. The connected first and second battery packs 110 and 120 are connected to one or more high voltage load or high voltage modules 150 for supplying power to the one or more high voltage loads 150.

The current injection circuit of the evaluation unit further includes a second DC/DC converter 122 that may be a high voltage to low voltage DC/DC converter, in particular, a bi-directional high voltage to low voltage DC/DC converter. While the first high voltage to low voltage DC/DC converter 112 is connected to the first high voltage battery pack 110 and the first low voltage load 118 (LV_O/P1), the second high voltage to low voltage DC/DC converter 122 is connected to the second high voltage battery pack 120 and a second low voltage load 128 (LV_O/OP2). As the low voltage power consumption on LV_O/P1 may not be equal to the low voltage power consumption on LV_O/P2, this may result in an energy unbalance between the first and second battery packs 110, 120.

Figure 3:
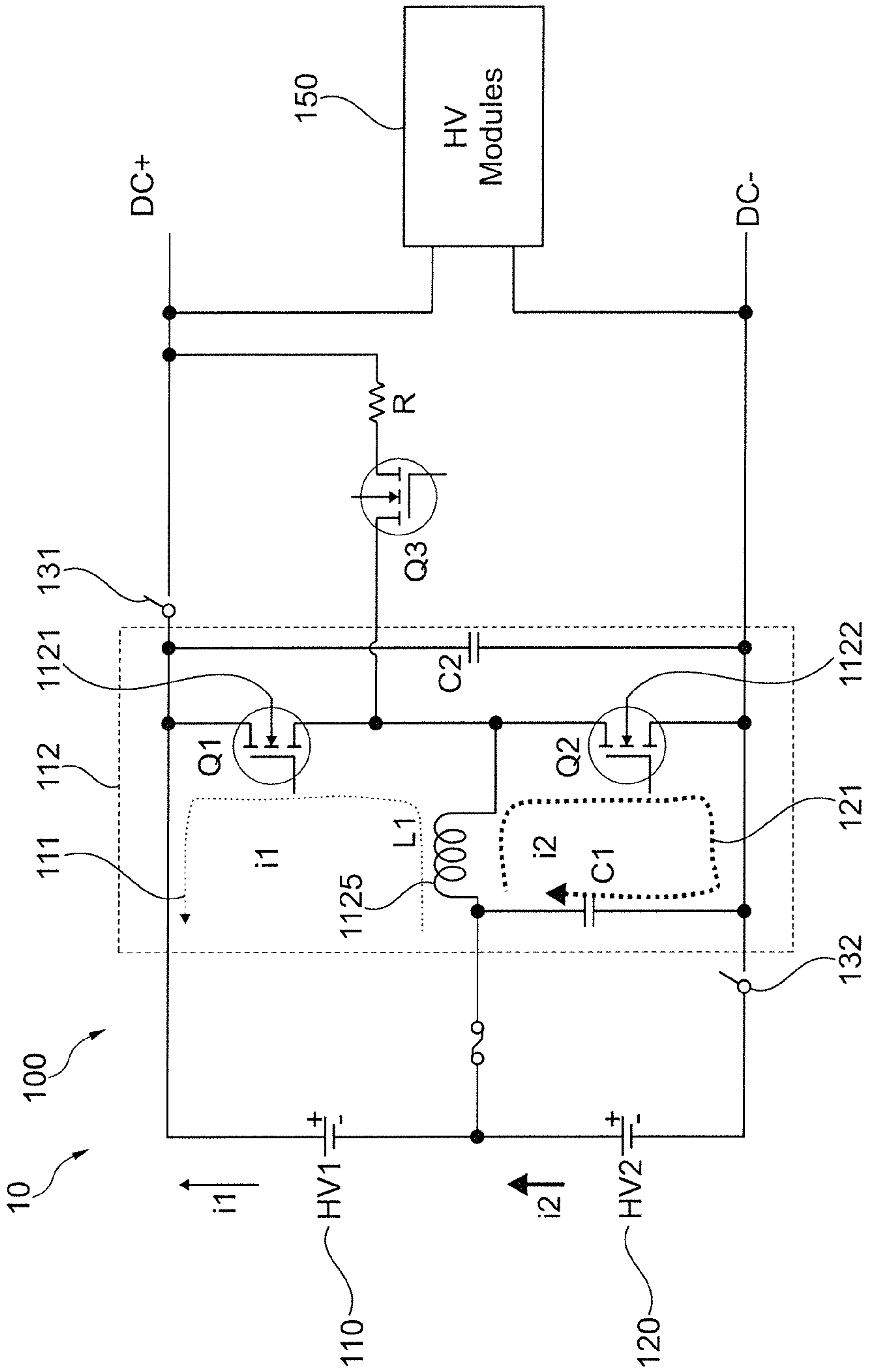
FIG. 3 shows schematically an example of a battery system according to the present disclosure.

FIG. 3 shows a further example of a battery system 100, which may provide an energy balance between the first and second battery packs 110, 120. In the alternative split battery electric vehicle architecture, another DC/DC converter is added between the first and second battery packs 110, 120. In this example, the first DC/DC converter 112 is a buck-boost DC/DC converter, in particular a high voltage to high voltage non-isolated buck-boost DC/DC converter which may transfer the energy from the first high voltage battery pack 110 to the second high voltage battery pack 120 and vice versa.

The first DC/DC converter 112 as a whole circuit component of the buck-boost DC/DC converter is electrically connected to the first battery pack 110 and the second battery pack 120 and designed to balance the energy difference between the first battery pack 110 and the second battery pack 120. The buck-boost DC/DC converter 112 includes a first transistor 1121 (Q1), which is electrically connected to the first battery pack 110, a second transistor 1122 (Q2), which is electrically connected to the second battery pack 120, and an energy soring unit 1125 consisting of a capacitor (C1) and an inductor (L1). The first transistor 1121, the second transistor 1122 and the energy storing unit 1125 are electrically interconnected. The first transistor 1121 and the second transistor 1122 may be a metal-oxide-semiconductor field-effect transistor (MOSFET), respectively.

In FIG. 3, the battery system 100 with the first DC/DC converter 112 or the high voltage to high voltage non-isolated buck-boost DC/DC converter is designed to generate injecting currents of a first current signal 111 (i1) for the first battery pack 110 and of a second current signal 121 (i2) for the second battery pack 120 at a plurality of frequencies ranging from 1 mHz to 4 kHz. The first DC/DC converter 112 may be configured to generate the first current signal 111 for the first battery pack 110 by turning on the second transistor 1122 and turning off the first transistor 1121 for a first predefined time interval for storing energy in the energy storing unit 1125, so that the stored energy may be able to charge the first battery pack 110 by turning on the first transistor 1121 and turning off the second transistor 1122. Alternatively, the first DC/DC converter 112 may be configured to generate a second current signal 121 for the second battery pack 120, and/or to charge the second battery pack 120, by turning on the first transistor 1121 and turning off the second transistor 1122 for a second predefined time interval, so that the second transistor 1122 is able to be turned on to charge the first battery pack 110.

Moreover, the first DC/DC converter 112 of the current injection circuit may be configured to alternatively switch the first transistor 1121 and/or the second transistor 1122 at the plurality of frequencies for generating the first current signal 111 and/or the second current signal 121 by regulating a first duty cycle of the first transistor 1121 and/or a second duty cycle of the second transistor 1122.

It is to be noted that the second contactor 132 is closed during the operation. The first duty cycle of the first transistor 1121 and the second duty cycle of the second transistor 1122 are regulated, respectively, depending on the current injection setpoints of the first current signal 111 and the second current signal 121 to charge the first battery pack 110 and the second battery pack 120. For example, the current injection to the first battery pack 110 may be performed by turning on the second transistor 1122 while the first transistor 1121 is turned off for long enough, so that the stored energy in the inductor L1 of the energy storing unit 1125 is used again during the first transistor 1121 is turned on while the second transistor 1122 in order to charge the first battery pack 110. The first and second transistors 1121, 1122 are alternatively switched with a frequency of at least few hundreds of kHz. In a similar way, the second battery pack 120 may be charged by turning on the first transistor 1121 while the second transistor 1122 is turned off for long enough, so that the stored energy in the inductor L1 of the energy storing unit 1125 is used again during the second transistor 1122 is turned on while the first transistor 1121 is turned off to charge the first battery pack 1121. The switching patterns of the first and second current signals 111 (i1) and 121 (i2) may be formed with different injection frequencies.

Figure 4A:
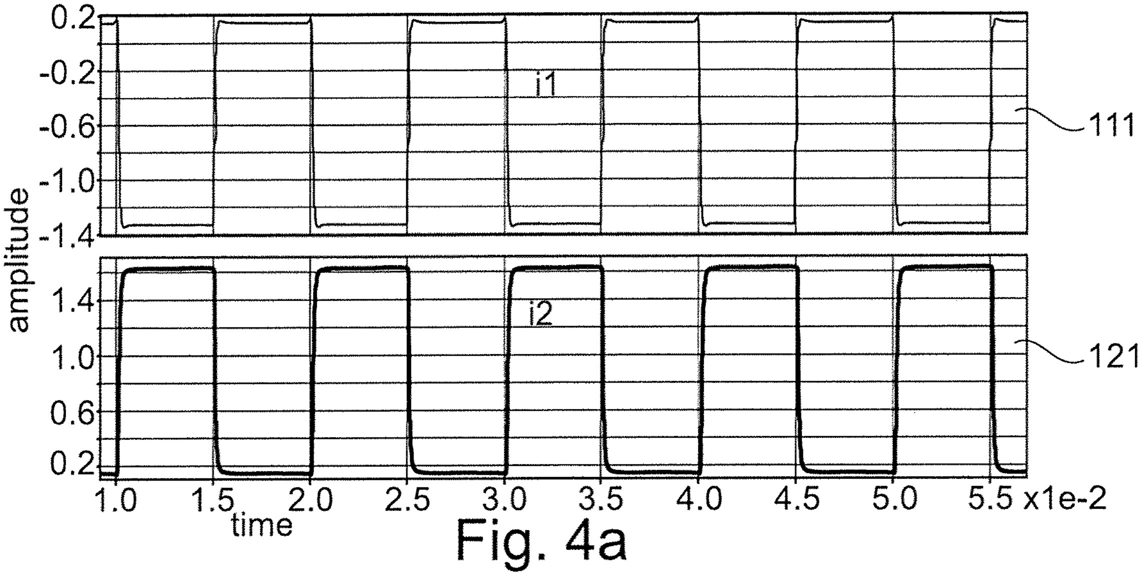
FIG. 4*a* shows a graph illustrating current signals of a battery system according to the present disclosure.
Figure 4B:
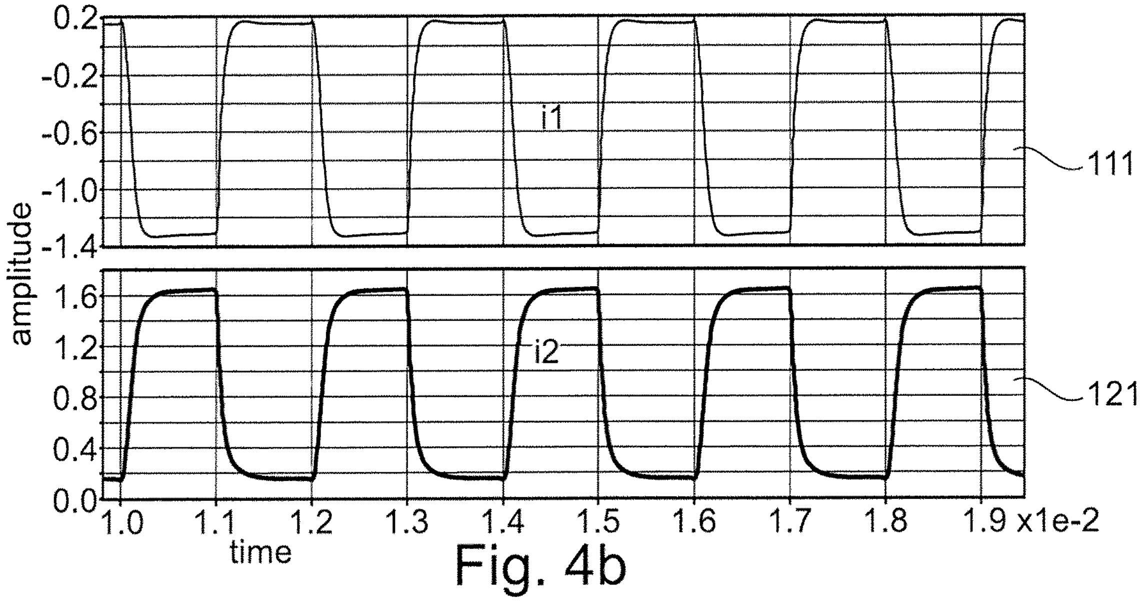
FIG. 4*b* shows a graph illustrating current signals of a battery system according to the present disclosure.
Figure 4C:
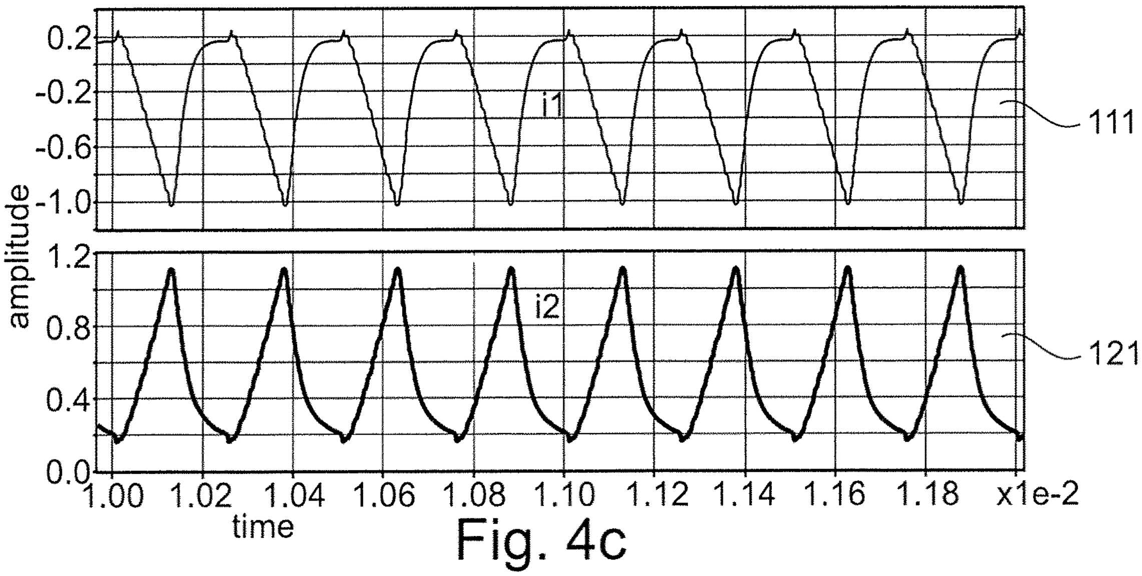
FIG. 4*c* shows a graph illustrating current signals of a battery system according to the present disclosure.

FIG. 4*a*, FIG. 4*b* and FIG. 4*c* show, respectively, graphs illustrating the current signals, namely the first current signal 111 and the second current signal 121 of a battery system 100 depending on the current injections into the first battery pack 110 and the second battery pack 120 at a plurality of injection frequencies, which may range from 1 mHz to 4 KHz. For example, the first current signal 111 and the second current signal 121 may be measured simultaneously. The vertical axis and the horizontal axis may be an amplitude of one of the current signals 111, 121 and a measuring time, respectively. The impedance of the first battery pack 110 and the second battery pack 120 may be measured by the measuring circuit of the evaluation unit simultaneously with the respective current flows injected current i1 of the first current signal 111 and the sourced current i2 of the second current signal 121. Depending on the current sensor direction, the i1 current of the first current signal 111 and the i2 current of the second current signal 121 may be measured either with a 0 degree phase shift or with a 180 degree phase shift.

In case of the current injection into the first battery pack 110 following the upper current direction shown in FIG. 3, the ratio between the measured voltage of the first battery pack 110 and the measured injected current i1 of the first current signal 111 for the first battery pack 110 and/or the ratio between the measured voltage of the second battery pack 120 to the sourced injected current i2 of the second current signal 121 for the second battery pack 120 may give the impedance information of the respective battery packs 110, 120. This may be applicable when the current flow direction may be reversed and the injection current may flow into the second battery pack 120 with the sourced current from the first battery pack 110.

For example, as shown in FIG. 4*a*, the first current signal 111 and the second current signal 121 are generated, respectively, at a first injection frequency of 100 Hz. At this frequency, both the first current signal 111 and the second current signal 121 follow a square waveshape, meaning that the majority of the current drawn from the second battery pack 120 is flowing into the first battery pack 110 and the influence of the capacitor C1 of the energy storing unit 1125 and a further capacitor C2, which may be electrically connected to the DC lines of the connected first and second battery packs 110 and 120, on the injected current for the first battery 110 at this frequency is very less or may be neglectable.

In contrast, at a higher injection frequency of 500 Hz as shown in FIG. 4*b*, the injected current of the first current signal 111 or the second current signal 121 almost follows the square waveshape and the influence of the capacitors C1, C2 is visible on the rising and falling edges of the current signals 111, 121. If the capacitances of the capacitors C1, C2 increase, a greater influence on the waveshape may be expected, especially when the injection frequency increases as well.

Further, at an injection frequency of 4000 Hz as shown in FIG. 4*c*, the injected current waveshape for the first current signal 111 or the second current signal 121 is completely changed or distorted, so that the influence of the capacitances of the capacitors C1, C2 is clearly visible, meaning that the capacitors C1, C2 are drawing higher currents compared to the lower injection frequencies.

Figure 6:
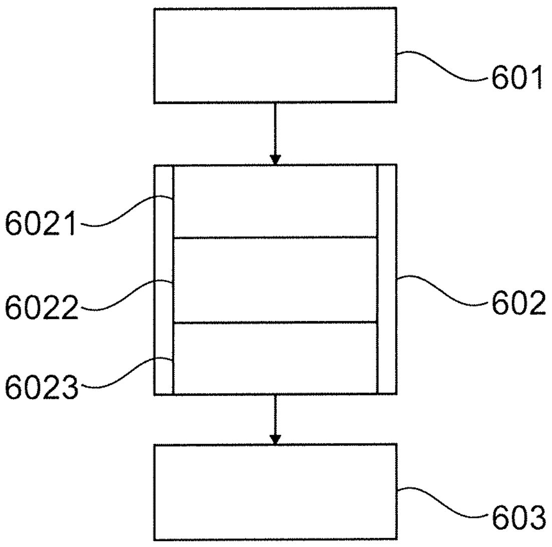
FIG. 6 shows schematically a flow chart illustrating a method for evaluating an impedance of a battery system for a vehicle according to the present disclosure.

FIG. 5 shows the vehicle 10 that includes a battery system 100 according to the present disclosure and a processing element 180, which may be designed to execute a computer program element for the battery system 100 for performing method steps as shown in FIG. 6.

In the electric vehicle 10 having the battery system 100, electrochemical impedance spectroscopy may be performed continuously or in a predefined interval, so that the state of health may be measured accurately and further characteristics of the battery packs 110, 120, for example, the aging, the lithium plating formation and the electrolyte conductivity, may be determined for evaluating in situ the performance of the battery packs 110, 120 and the safety and reliability of the electric vehicle 10.

FIG. 6 shows a flow chart illustrating a method for evaluating an impedance of a battery system 100 for a vehicle 10. The method may start at step 601 where a current injection circuit of an evaluation unit may be arranged in a battery system 100 or adjacent to the first battery pack 110 of the battery system 100. Hence, the evaluation unit, which may include the current injection circuit having a first DC/DC converter 112 and a measuring circuit, may be provided for performing the electrochemical impedance spectroscopy analysis on the first battery pack 110.

At a subsequent step 602, a first current signal 111 at a plurality of frequencies may be generated by means of the first DC/DC converter 112 of the current injection circuit. The first DC/DC converter 112 may be a bi-directional first high voltage to low voltage DC/DC converter or a high voltage to high voltage buck-boost DC/DC converter.

At a further step 603, the first current signal 111 as a result of the current injection from the first DC/DC converter 112 may be recorded and analyzed by means of the measuring circuit of the evaluation unit and the impedance of the first battery pack 110 may be evaluated by means of a ratio of a voltage difference of the first battery pack 110 to the current of the first current signal 111.

In order to generate an injection current to the first battery pack 110 or, if a second battery pack 120 is arranged in the battery system 100 and electrically connected to the first battery pack 110 in series, to the second battery pack 120, various first DC/DC converter 112 may be used for an individual electric vehicle architecture, which may be an electric vehicle high voltage architecture, a split battery electric vehicle high voltage architecture or an energy-balancing electric vehicle architecture having multiple battery packs 110, 120.

For example, the first current signal 111 for the first battery pack 110 may be generated by means of the first DC/DC converter 112 as the high voltage to low voltage DC/DC converter at different frequencies by using a reverse power transfer mode of the first DC/DC converter 112.

Alternatively, the first current signal 111 and a second current signal 121 may be generated, respectively, by means of the first DC/DC converter 112 as the high voltage to high voltage buck-boost DC/DC converter. In particular, at a substep 6021, the first current signal 111 may be generated for the first battery pack 110 by means of the first DC/DC converter 112 or the high voltage to high voltage buck-boost DC/DC converter by turning on a second transistor 1122 of the first DC/DC converter 112, while turning off a first transistor 1121 of the first DC/DC converter 112 for a first predefined time interval for storing energy in an energy storing unit 1125 of the first DC/DC converter 112. As such, the stored energy may be able to charge the first battery by turning on the first transistor 1121 and turning off the second transistor 1122.

Alternatively or additionally, at a further substep 6022, a second current signal 121 for evaluating the impedance of a second battery pack 120 may be generated by means of the first DC/DC converter 112 by turning on the first transistor 1121, while turning off the second transistor 1122 for a second predefined time interval, so that the second transistor 1122 may be able to be turned on to charge the first battery pack 110.

At a further substep 6023, the first transistor 1121 and/or the second transistor 1122 of the first DC/DC converter 112 or the high voltage to high voltage buck-boost DC/DC converter may be alternatively switched, for example by means of a switching unit provided in the first DC/DC converter 112, at a plurality of frequencies by regulating a first duty cycle of the first transistor 1121 and/or a second duty cycle of the second transistor 1122.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A battery system for a vehicle, the battery system comprising:
- a first battery pack connected to a first load by a first contactor; and
- an evaluation unit, configured for evaluating an impedance of the first battery pack, the evaluation unit comprising:
  - a current injection circuit comprising a first DC/DC converter; and
  - a measuring circuit;
- wherein the current injection circuit is arranged in the battery system and/or adjacent to the first battery pack of the battery system;
- wherein the first DC/DC converter is configured to generate a first current signal at a plurality of frequencies; and
- wherein the measuring circuit is configured to first open the first contactor to block a connection of the first battery pack to the first load and subsequently record and/or analyze the first current signal from the first DC/DC converter for evaluating the impedance of the first battery pack by means of a ratio of a voltage difference of the first battery pack to the current of the first current signal.

2. The battery system according to claim 1, further comprising:
- a second battery pack;
- wherein the second battery pack is connected to the first battery pack in series.

3. The battery system according to claim 2, wherein
- the first DC/DC converter is a high voltage to low voltage DC/DC converter or a bi-directional high voltage to low voltage DC/DC converter; and
- the first DC/DC converter is electrically connected to the first battery pack and/or configured to operate in a reverse power transfer mode for charging the first battery pack.

4. The battery system according to claim 3, wherein
- the current injection circuit of the evaluation unit further comprises a second DC/DC converter;
- the second DC/DC converter is a high voltage to low voltage DC/DC converter and/or a bi-directional high voltage to low voltage DC/DC converter; and
- the second DC/DC converter is electrically connected to the second battery pack and/or configured to operate in the reverse power transfer mode for charging the second battery pack.

5. The battery system according to claim 2, wherein
- the first DC/DC converter is a buck-boost DC/DC converter and/or a high voltage to high voltage buck-boost DC/DC converter; and
- the first DC/DC converter is electrically connected to the first battery pack and/or the second battery pack and configured to balance an energy difference between the first battery pack and the second battery pack.

6. The battery system according to claim 5, wherein
- the first DC/DC converter comprises a first transistor, electrically connected to the first battery pack, a second transistor, electrically connected to the second battery pack, and an energy storing unit; and
- the first transistor, the second transistor and the energy storing unit are electrically interconnected.

7. The battery system according to claim 6, wherein the energy storing unit is a circuit comprising an inductor and/or a capacitor.

8. The battery system according to claim 6, wherein the first DC/DC converter is configured to generate the first current signal for the first battery pack by turning on the second transistor and turning off the first transistor for a first predefined time interval for storing energy in the energy storing unit, the stored energy being able to charge the first battery pack by turning on the first transistor and turning off the second transistor; and/or the first DC/DC converter is configured to generate a second current signal for the second battery pack, and/or to charge the second battery pack, by turning on the first transistor and turning off the second transistor for a second predefined time interval, so that the second transistor is able to be turned on to charge the first battery pack.

9. The battery system according to claim 6, wherein the first DC/DC converter of the current injection circuit is configured to alternatively switch the first transistor and/or the second transistor at the plurality of frequencies for generating the first current signal and/or the second current signal by regulating a first duty cycle of the first transistor and/or a second duty cycle of the second transistor.

10. The battery system according to claim 8, wherein the first current signal and/or the second current signal of the current injection circuit is/are a pulse current signal at the plurality of frequencies ranging from 1 mHz to 4 kHz.

11. The battery system according to claim 1, wherein the first battery pack is also connected to the first load by a second contactor; and the measuring circuit is configured to also open or close the second contactor prior to evaluating the impedance of any battery pack.

12. A vehicle comprising:

a battery system comprising:

a first battery pack connected to a first load by a first contactor; and an evaluation unit, configured for evaluating an impedance of the first battery pack, the evaluation unit comprising:

a current injection circuit comprising a first DC/DC converter; and a measuring circuit;

wherein the current injection circuit is arranged in the battery system and/or adjacent to the first battery pack of the battery system;

wherein the first DC/DC converter is configured to generate a first current signal at a plurality of frequencies; and wherein the measuring circuit is configured to first open the first contactor to block a connection of the first battery pack to the first load and subsequently record and/or analyze the first current signal from the first DC/DC converter for evaluating the impedance of the first battery pack by means of a ratio of a voltage difference of the first battery pack to the current of the first current signal.

13. A method for evaluating an impedance of a battery system for a vehicle, the method comprising:

arranging a current injection circuit of an evaluation unit in the battery system adjacent to a first battery pack of the battery system, wherein the first battery pack is connected to a first load by a first contactor;

by means of a measuring circuit of the evaluation unit, first opening the first contactor to block a connection of the first battery pack to the first load;

subsequently generating a first current signal at a plurality of frequencies by means of a first DC/DC converter of the current injection circuit; and subsequently recording and analyzing the first current signal from the first DC/DC converter by means of the measuring circuit and evaluating the impedance of the first battery pack by means of a ratio of a voltage difference of the first battery pack to the current of the first current signal.

14. The method according to claim 13, further comprising:

generating the first current signal for the first battery pack by means of the first DC/DC converter as a high voltage to low voltage DC/DC converter or a bi-directional high voltage to low voltage DC/DC converter at the plurality of frequencies by using a reverse power transfer mode of the first DC/DC converter; or generating the first current signal for the first battery pack by means of the first DC/DC converter as a buck-boost DC/DC converter by turning on a second transistor of the first DC/DC converter while turning off a first transistor of the first DC/DC converter for a first predefined time interval for storing energy in an energy storing unit of the first DC/DC converter, the stored energy being able to charge the first battery pack by turning on the first transistor and turning off the second transistor; and/or generating a second current signal for a second battery pack by means of the first DC/DC converter by turning on the first transistor while turning off the second transistor for a second predefined time interval, so that the second transistor is able to be turned on to charge the first battery pack; and alternatively switching the first transistor and/or the second transistor of the first DC/DC converter at the plurality of frequencies by regulating a first duty cycle of the first transistor and/or a second duty cycle of the second transistor.

15. A computer program element, for the battery system, when being executed by a processing element of the vehicle, being adapted to perform the method steps of claim 13.

16. The battery system according to claim 1, wherein the first battery pack is a high voltage battery pack and the first DC/DC converter is coupled between the first battery pack and a low voltage battery.

17. The battery system according to claim 16, wherein the low voltage battery is coupled to a low voltage load and a chassis of the vehicle.

* * * * *